UNITED STATES PATENT OFFICE.

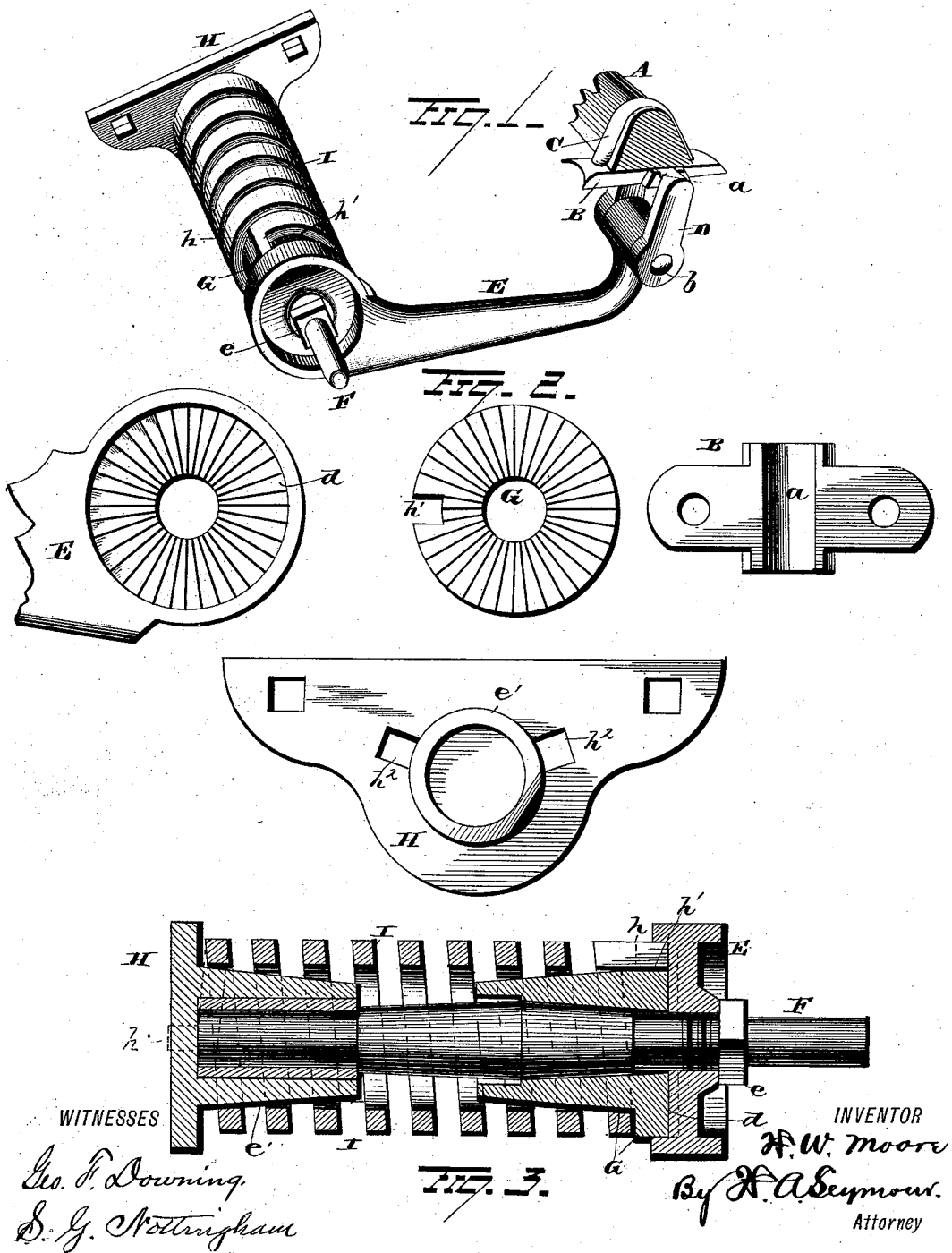

HOLLIS W. MOORE, OF OLEAN, NEW YORK.

SIDE-BAR VEHICLE.

SPECIFICATION forming part of Letters Patent No. 298,016, dated May 6, 1884.

Application filed February 14, 1884. (No model.)

*To all whom it may concern:*

Be it known that I, H. W. MOORE, of Olean, in the county of Cattaraugus and State of New York, have invented certain new and useful Improvements in Side-Bar Spring Couplings for Vehicles; and I do hereby declare the following to be a full, clear, and exact description of the invention, such as will enable others skilled in art to which it appertains to make and use the same.

My invention relates to an improvement in side-bar spring couplings for vehicles, the object of the same being to provide devices of such form as to afford an easy motion to the body of the vehicle in passing over rough roads. A further object is to facilitate the adjustment of the vehicle-body. A further object is to afford means whereby the coil-springs employed may be contracted and strengthened to compensate for heavy loads upon the vehicle. And with these ends in view my invention consists in the parts and combinations of parts as will be more fully described, and pointed out in the claims.

In the drawings, Figure 1 represents a perspective view of my improvement. Fig. 2 shows the parts detached, and Fig. 3 is a vertical sectional view on the line $x\,x$ of Fig. 1.

A represents the side bar of a vehicle, to which the clip-tie B is secured by the clip C, in the usual manner. This clip-tie B is provided with a central semicircular bearing, $a$, in which the stirrup D rests. The arm E is curved substantially as shown in the drawings, and is provided at its outer end with an eye similar to the eye of a carriage-pole, through which the bolt $b$, which secures it to the stirrup, passes, and at its inner end with an enlarged head, $c$, having a circular serrated or toothed disk, $d$, and an opening for the passage of the shaft F, and also with an enlarged head, the face of which is serrated or toothed, to correspond with the serrated circular disk $d$ of the arm E. The sleeve G is rigidly secured to the arm E by the shaft F, which latter passes through the sleeve, and is secured therein by the nut $e$, which latter is screwed onto the end of the shaft projecting beyond the outer face of the arm E. The bore of the sleeve can be tapering or conical to limit the penetration of the shaft F; or the said bore can be straight and the shaft provided with a shoulder adapted to abut against the sleeve or the arm E; or the shaft and sleeve can be formed integral and accomplish the same end, the objects being simply to connect the parts so that the sleeve can be adjusted on the arm, and this can be accomplished by using any one of the constructions before referred to. After the shaft has been passed through the sleeve and arm, it is secured therein by the nut, the tendency of which is to tighten the parts as the vehicle-body descends, and prevent the possibility of the sleeve turning or moving within the circular depression in the arm E.

H represents a bracket adapted to be secured in any desired manner to the under side of the vehicle-body, for the purpose of supporting one end of the shaft F. This bracket is provided with a conical shell, $e'$, on one side, adapted to receive the free end of the shaft, and also form a core for the coiled spring, which will be referred to later on. This shell is preferably lined with leather or other suitable packing, to insure a noiseless contact between the shell and shaft. This shell and bracket support one end of the shaft F, while the opposite end of the said shaft is supported in a suitable bracket, also rigidly secured to the under side of the vehicle-body.

I represents a coiled spring surrounding the shaft, shell, and sleeve, and having its ends $h$ turned at right angles to the end coils, to adapt said ends to either, respectively, an open slot, $h'$, formed in the head of the sleeve, or the slot $h^2$ of the bracket.

It will be understood that four of the above-described couplings are designed to be used on a single vehicle; but it is evident that six or eight can be employed, if necessary.

The vertical adjustment of the body of the vehicle is obtained by loosening the nut on the shaft and raising the body to the desired height, and then tightening the nut, which forces the serrated faces of the arm and sleeve firmly together and holds the parts in proper position. A further usefulness of this adjustable arrangement is, that in hanging the body the builder does not have to bend the arms E when it is necessary to elevate or lower the body, as is ordinarily done, but simply puts the parts together or elevates the body to the desired height and then tightens the nuts.

The principal advantages of this invention are, first, by using the torsional coil-springs, the motion of the carriage-body, when the vehicle is passing over rough roads, is very easy and pleasant to its occupant; second, by its adjustability, the labor of bending and fitting the irons to the body, either in making a new vehicle or repairing an old one, is saved; third, by the tapering form of the shells and sleeves, the springs are caused to shorten and strengthen as the load increases, thereby making the riding equally easy with a light or heavy load.

My improvement is exceedingly simple in construction, is durable and effective in use, is of few parts, and is adapted to be applied to all side-bar vehicles without increasing the cost of manufacture.

It is evident that slight changes in the construction and relative arrangement of the several parts might be resorted to without departing from the spirit of my invention; and hence I would have it understood that I do not confine myself to the exact construction shown and described, but consider myself at liberty to make such changes and alterations as fairly fall within the spirit and scope of my invention.

Having fully described my invention, what I claim as new, and desire to secure by Letters Patent, is—

1. The combination, with a bracket provided with a shell, and a second bracket or bearing, a shaft supported in said brackets, and a sleeve placed on said shaft, the said sleeve being provided with a serrated head, of an arm having a serrated portion adapted to engage the serrated portion of the sleeve, and a coiled spring, one end of which is secured to the bracket having the shell thereon, while the opposite end is secured to the sleeve.

2. The combination, with a shaft suitably journaled to the under side of a vehicle-body, a sleeve placed on said shaft, and an arm secured to the sleeve, of a coiled spring, one end of which is indirectly connected to the vehicle-body, while the opposite end is secured to the sleeve.

3. The combination, with the shaft, the bracket provided with the shell, and a second bracket or bearing, of the sleeve, arm, clip, clip-tie, and stirrup, substantially as set forth.

4. The combination, with supporting-brackets, the sleeve, arm, and nut for securing the parts together, of a coiled spring, one end of which is indirectly connected to the vehicle-body, while the opposite end is secured to the sleeve, substantially as set forth.

In testimony whereof I have signed this specification in the presence of two subscribing witnesses.

HOLLIS W. MOORE.

Witnesses:
J. S. ABRAMS,
HORACE A. L. BEARDSLEY.